United States Patent
Casey et al.

(10) Patent No.: US 11,724,464 B2
(45) Date of Patent: Aug. 15, 2023

(54) SYSTEM AND PROCESS FOR GLUING FABRIC

(71) Applicant: Acelorex, Inc., Penfield, NY (US)

(72) Inventors: Brendan Casey, Webster, NY (US);
Michael Leo, Penfield, NY (US);
George Gibson, Fairport, NY (US)

(73) Assignee: Acelorex Inc., Penfield, NY (US)

( * ) Notice: Subject to any disclaimer, the term of this patent is extended or adjusted under 35 U.S.C. 154(b) by 229 days.

(21) Appl. No.: 17/227,736

(22) Filed: Apr. 12, 2021

(65) Prior Publication Data
US 2021/0323243 A1    Oct. 21, 2021

Related U.S. Application Data

(60) Provisional application No. 63/010,782, filed on Apr. 16, 2020.

(51) Int. Cl.
*B29C 65/00* (2006.01)
*B29C 65/48* (2006.01)

(52) U.S. Cl.
CPC ........ *B29C 66/729* (2013.01); *B29C 65/4825* (2013.01); *B29C 65/4835* (2013.01); *B29C 65/4845* (2013.01); *B29C 66/1122* (2013.01)

(58) Field of Classification Search
CPC . B29C 65/482; B29C 65/4825; B29C 65/483; B29C 65/4835; B29C 65/4845; B29C 65/486; B29C 65/52; B29C 65/522; B29C 65/524; B29C 65/526; B29C 66/1122; B29C 66/20; B29C 66/21; B29C 66/232; B29C 66/43; B29C 66/729

USPC .. 156/60, 272.2, 275.1, 275.3, 275.5, 275.7, 156/283, 284, 290, 291, 324, 338
See application file for complete search history.

(56) References Cited

U.S. PATENT DOCUMENTS

| | | | | |
|---|---|---|---|---|
| 1,931,612 | A | * | 10/1933 | Kahlmeyer ............ A43B 23/07 156/283 |
| 2,746,898 | A | * | 5/1956 | Buckwalter ................ C08J 5/06 156/335 |
| 4,333,980 | A | * | 6/1982 | Russell ..................... B32B 5/26 2/232 |
| 2010/0243150 | A1 | * | 9/2010 | Morimoto ................ C08J 5/124 156/275.3 |

FOREIGN PATENT DOCUMENTS

DE          2110972 A1 *  9/1972

* cited by examiner

*Primary Examiner* — Philip C Tucker
*Assistant Examiner* — Brian R Slawski
(74) *Attorney, Agent, or Firm* — Michael J. Nickerson; Dawson Law Firm, PC

(57) ABSTRACT

A method and system applying glue to a fabric to create a bonded seam by applying a carrier liquid to a predetermined area of a first piece of fabric and in a pre-determined pattern; applying uniformly, to the first piece of fabric, particles of a powdered elastomer such that the particles of the powdered elastomer adhere to the applied carrier liquid; removing excess particles of the powdered elastomer, the excess particles of the powdered elastomer being particles of the powdered elastomer not adhering to the applied carrier liquid; applying a second piece of fabric to the predetermined area of a first piece of fabric; and curing the particles of a powdered elastomer to create a bonded seam between the first piece of fabric and the second piece of fabric.

10 Claims, 4 Drawing Sheets

SYSTEM AND PROCESS FOR GLUING FABRIC

PRIORITY INFORMATION

The present application claims priority, under 35 U.S.C. § 119(e), from U.S. Provisional Patent Application, Ser. No. 63/010,782, filed on Apr. 16, 2020. The entire content of U.S. Provisional Patent Application, Ser. No. 63/010,782, filed on Apr. 16, 2020, is hereby incorporated by reference.

BACKGROUND

Currently, the assembling of fabric requires sewing, which is labor intensive. Due to labor intensity, the assembling of fabric can be very expensive in most western countries. On the other hand, if the assembling of fabric is performed in low labor cost countries, the assembling requires a long lead time due to transport constraints. The high cost and/or the long lead times are not acceptable in the assembling of fabric.

One possible alternative to sewing is to "glue" the fabric together. The ability to glue fabric together would allow companies to make garments locally with no sewing, and low labor costs as much of the process can be automated. This would allow manufacturing to be close the source of demand, shorten lead times, and enable fast response to increasingly local market changes.

Many industrial processes rely on gluing one component to another. Adhesives transmit stresses from one member of a joint to another with a more uniform distribution than conventional mechanical fasteners give.

Consequently, adhesives often allow structures that are mechanically equivalent to, or stronger than, conventional assemblies to be built at lower cost and weight.

However, for a glue to be practical in fabric assembling, the glue should have certain characteristics, such as bond strength, bond elasticity, resistance to discoloration, and imperviousness to repeated laundering.

Moreover, the application of glue, in any environment, can be difficult however, because of its rheology.

There are six general categories of glue application techniques: dots/beads, sheet thermal transfer, spray, web coating, coating wheels, and brushes.

Dots and beads can be applied a number of conventional ways. There are handheld guns, not unlike caulking guns and electric or pneumatic guns, which are fed by a central supply. The guns can produce stripes or bands between 6 and 152 mm wide and work best when applying glue to horizontally orientated substrates.

The speed at which the guns operate is highly dependent on the shape of the pattern. As the pattern increases in complexity, the speed at which the guns can operate decreases rapidly. Some of these guns resemble low resolution jetting, capable of resolutions as small as 175 micrometers at speeds up to 400 mg/second.

In conventional thermal donor sheet processes, a sheet of paper is coated with a release layer and then a glue layer to comprise a donor sheet. The completed donor sheet is trimmed into the desired shape, pressed on one side of the fabric, the paper removed, and the second fabric is pressed on top. This conventional method has a lot of waste and is limited in the glues that can be used.

Conventional air driven spray techniques can work with low viscosity glues, dispensing microliter to milliliter amounts, largely in round patterns with diameters ranging from 4.3 to 50.8 mm (0.17" to 2.0") and in fan patterns with widths up to 165.1 mm.

Conventional airless, pneumatic processes, which can tolerate slightly higher viscosities, can produce high uniformity when dose dependence is critical but have relatively low resolution.

Conventional web applicators include slot, roller, fiberized sprays, donor sheet thermal application, and dip coating variants. These conventional methods have some capability for image-wise application. Depending on the variant, these conventional methods can apply relatively thick coatings but require more maintenance as glue dries in the apparatus.

Conventional brush applications are the lowest cost techniques, but conventional brush applications also lowers precision, uniformity, and reliability.

In these various conventional processes, there is an issue with (1) a precise application of adhesive, (2) applying an adhesive bond in intricate patterns, and (3) applying an adhesive bond to non-planar substrates, both precisely and in intricate patterns.

One possible technique for realizing a precise application of a material or an application of a material in an intricate pattern is digital ink jet architectures.

However, conventional digital ink jet architectures cannot apply glues because glues tend to be fairly viscous and conventional digital ink jet architectures operate using materials (inks) having a low viscosity (less than 200 cp). More specifically, conventional glues have flow characteristics not conducive to jetting and the conventional glues tend to form long threads instead of distinct drops.

Therefore, it is desirable to provide a fabric assembling process which relies upon gluing instead of sewing.

Also, it is desirable to provide a fabric assembling process which relies upon gluing and is capable of applying the glue in a precise manner.

Additionally, it is desirable to provide a fabric assembling process which relies upon gluing and is capable of applying the glue in an intricate pattern.

Furthermore, it is desirable to provide a fabric assembling process which relies upon gluing that incorporates a digital jetting architecture to provide a precise application of an adhesive.

Lastly, it is desirable to provide a fabric assembling process which relies upon gluing that incorporates a digital jetting architecture to provide a precise application of an adhesive to form an intricate pattern.

BRIEF DESCRIPTION OF THE DRAWING

The drawings are only for purposes of illustrating various embodiments and are not to be construed as limiting, wherein.

DETAILED DESCRIPTION OF THE DRAWING

Figure 1:
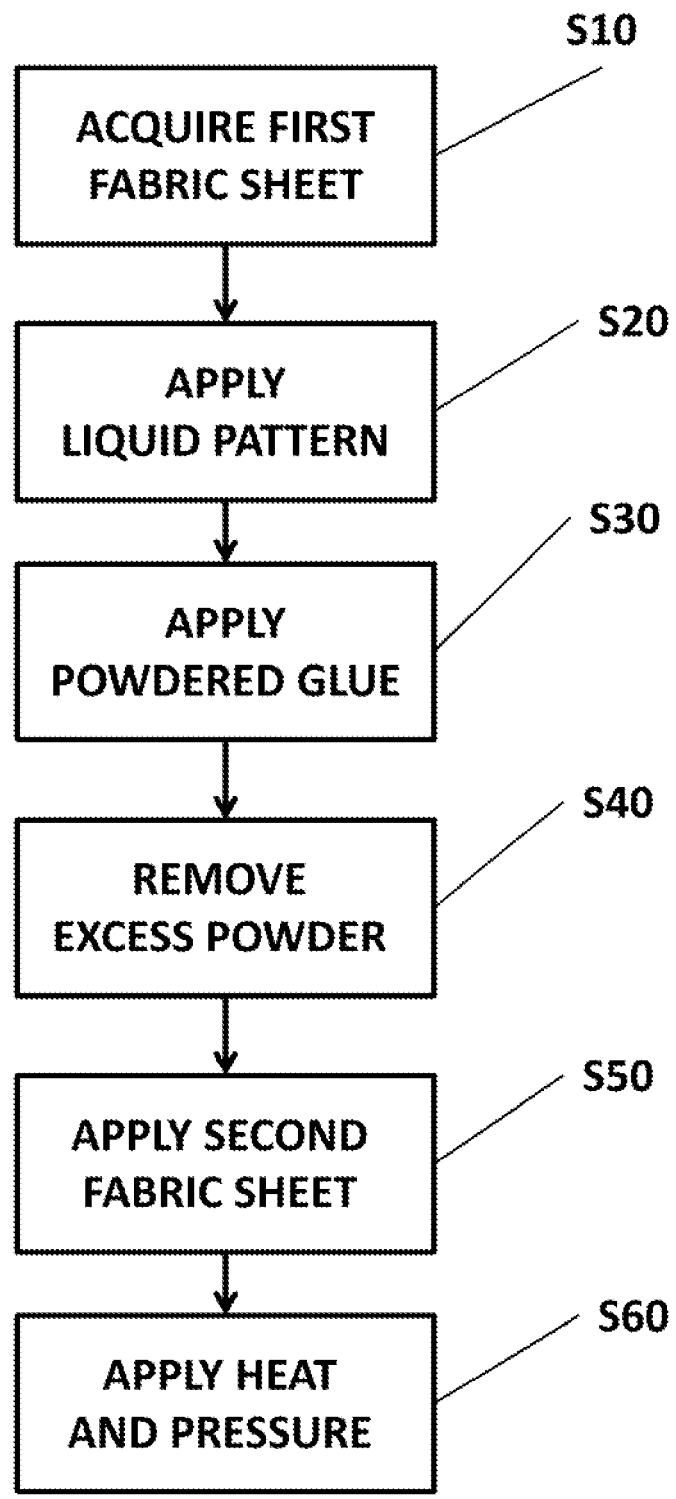
FIG. 1 illustrates process for utilizing a digital jetting architecture to provide application of an adhesive to assemble two pieces of fabric.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In the following description, adhesive and glue are used interchangeably.

As noted above, it is desirable to utilize digital jetting architecture to apply glue to a fabric for assembling purposes; however, conventional glues are not conducive to conventional jetting.

To resolve this issue, the application of the glue to the fabric is separated into two distinct applications as illustrated in the method of FIG. 1. As illustrated in FIG. 1, a piece of fabric is acquired in step S10.

At step S20, a liquid is applied to a predetermined area of the fabric and in a pre-determined pattern. The liquid, used in step S20, is a liquid having characteristics or properties that enable particles of a powdered elastomer to adhere thereto. In other words, the liquid, used in step S20, is a carrier or container for the powdered elastomer so that the adhered to powdered elastomer is kept within the predetermined area of the fabric and in the pre-determined pattern.

At step S30, particles of a powdered elastomer are applied uniformly to the fabric. The particles of a powdered elastomer will adhere to the fabric where the liquid, applied in step S20, is located and not to the fabric lacking the applied liquid.

At step S40, excess particles of a powdered elastomer are removed from the fabric. A vacuum can be used to remove the excess particles of a powdered elastomer. Additionally, an air knife or a combination of a vacuum and air knife can be used to remove the excess particles of a powdered elastomer. It is noted that the removed excess particles of a powdered elastomer can be reused.

At step S50, a second piece of fabric is applied over the first fabric, and at step S60, the particles of a powdered elastomer are activated. The particles of a powdered elastomer can be activated by heat, pressure, a solvent, light, etc., or any combination thereof.

It is noted that the fabric can be precut, in a roll, or other such format that is convenient.

In alternative embodiments, the patterned image can be realized by spraying the fluid over a stencil or mask, by screen printing, by needle array, by scanning air or pneumatically controlled orifices, by air or pneumatic orifice arrays, or other such methods or devices.

It is noted that the removal of the excess powder can be realized by vacuuming; by turning the fabric over and having gravity pull the loose powder off, by blowing the loose powder off, by adhesive roller application, or by other such method.

In some cases, it may be helpful to partially melt or attach the glue to the first fabric before the second fabric is joined in a seam. This can be done by allowing the liquid, applied in step S20, to activate the adhesive powder, rendering the adhesive powder tacky, partially melting the adhesive, or partially curing the adhesive either before or after the removal of the powder.

The fabric to be joined to the seam may be placed on the original fabric, and by applying heat and pressure, the glue is activated and the fabrics joined. Other adhesives may require light or other chemicals to activate the adhesive.

It is noted that additional layers can be stacked to make multilayer seams

The method of FIG. 1 allows the patterning of the glue to control the way the seam stretches. In general, a solid line of glue will stretch less than a dotted line of glue.

The ability to control the pattern allows the user to design a glue pattern for stretch, which is parallel or perpendicular to the seam or any angle in between. Additionally, patterns can be formed to allow for stretch in all directions.

Figure 2:
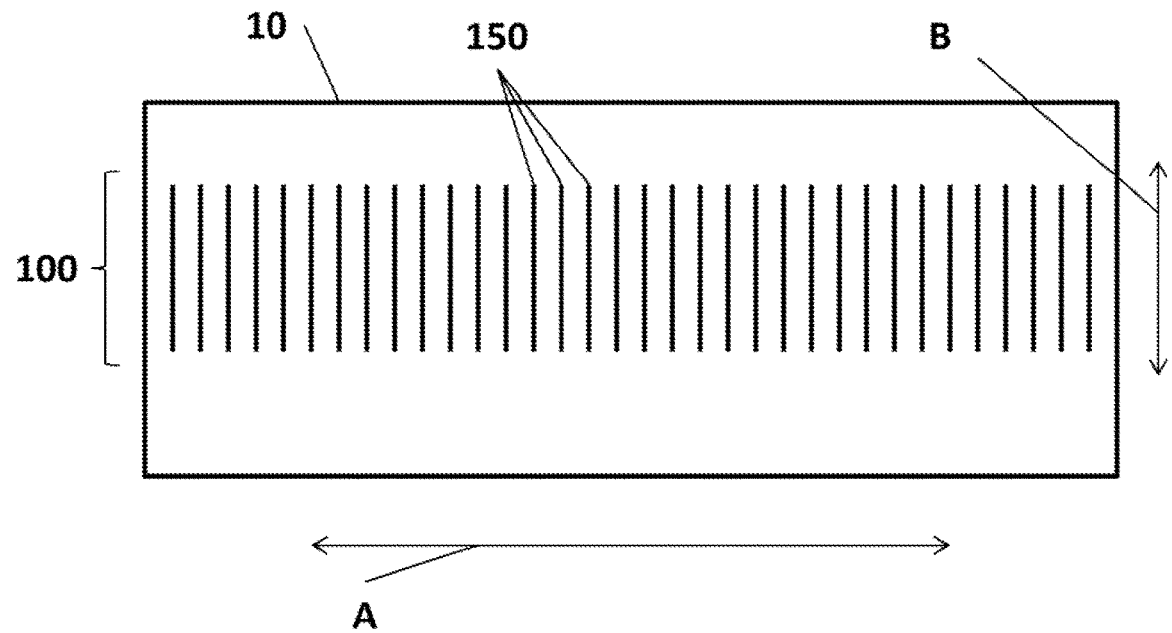
FIG. 2 illustrates an example of an adhesive pattern forming a seam between two pieces of fabric.

FIG. 2 shows an example of a glue pattern. As illustrated in FIG. 2, the fabric 10 has a glue pattern 150 upon which a seam 100 will be formed. With respect to FIG. 2, the glue pattern 150 is a series of lines having a direction parallel to double-ended arrow B. In this example, the seam 100 has more stretch in the direction parallel to double-ended arrow A, and less stretch in the direction parallel to double-ended arrow B. In other words, the seam 100 has more stretch in a direction perpendicular to a direction of the glue pattern lines.

Figure 3:
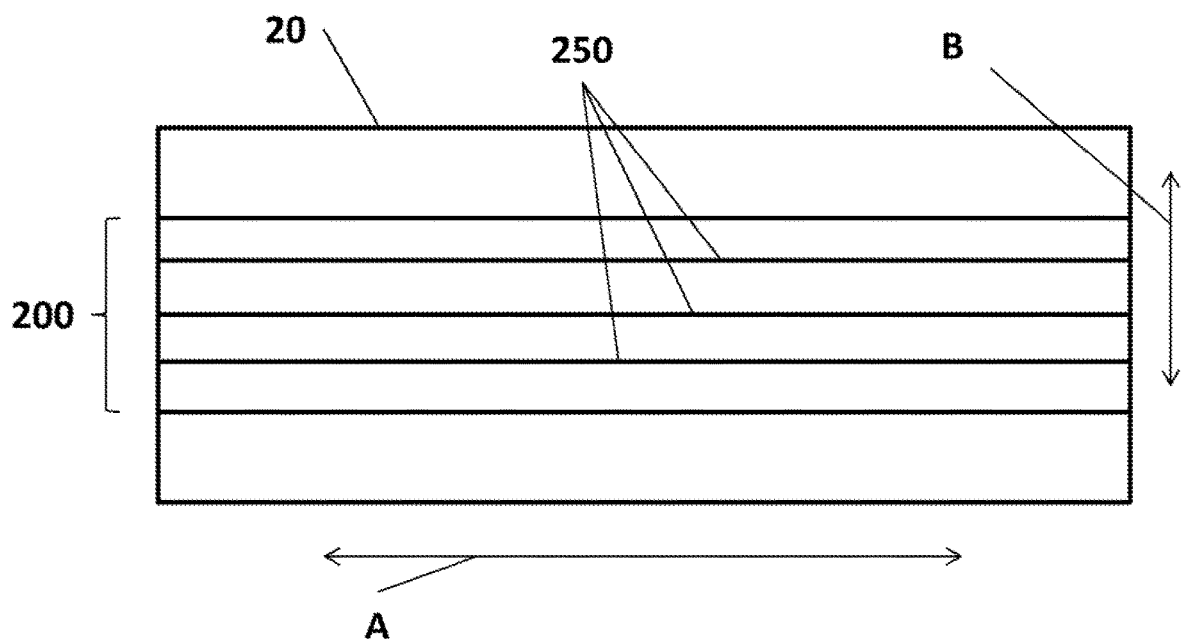
FIG. 3 illustrates another example of an adhesive pattern forming a seam between two pieces of fabric.

FIG. 3 shows another example of a glue pattern. As illustrated in FIG. 3, the fabric 20 has a glue pattern 250 upon which a seam 200 will be formed. With respect to FIG. 3, the glue pattern 250 is a series of lines having a direction perpendicular to double-ended arrow B. In this example, the seam 200 has more stretch in the direction parallel to double-ended arrow B, and less stretch in the direction parallel to double-ended arrow A. In other words, the seam 200 has more stretch in a direction perpendicular to a direction of the glue pattern lines.

Figure 4:
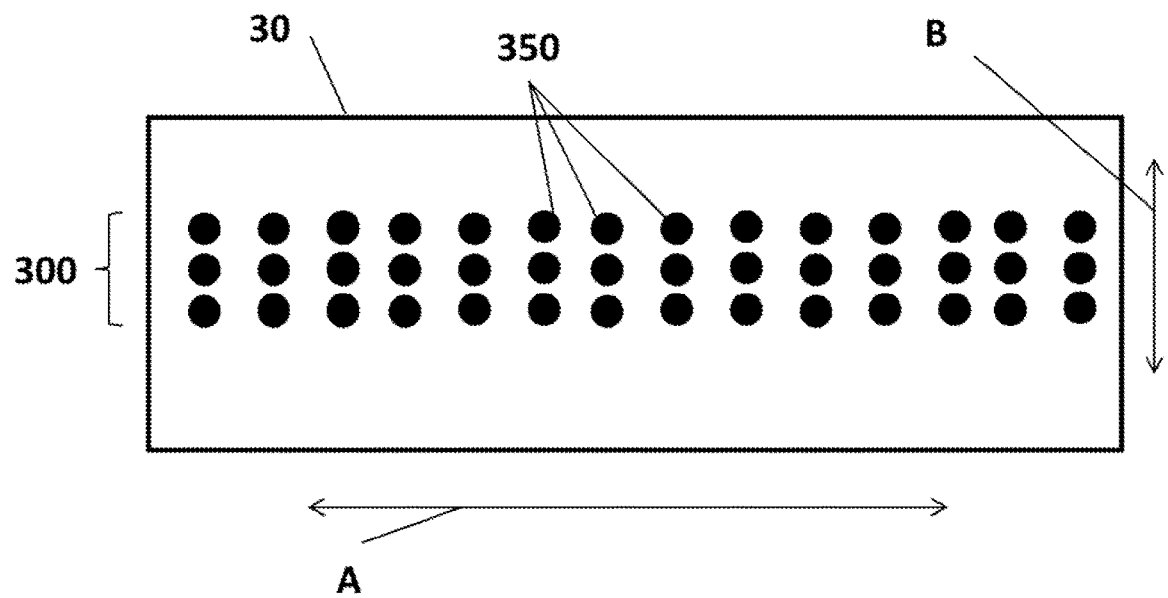
FIG. 4 illustrates a third example of an adhesive pattern forming a seam between two pieces of fabric.

FIG. 4 shows another example of a glue pattern. As illustrated in FIG. 4, the fabric 30 has a glue pattern 350 upon which a seam 300 will be formed. With respect to FIG. 4, the glue pattern 350 is a uniform pattern of dots of glue. In this example, the seam 300 has equal stretch in both the direction parallel to double-ended arrow B and the direction parallel to double-ended arrow A. In other words, the seam 300 has equal directional stretch.

Figure 5:
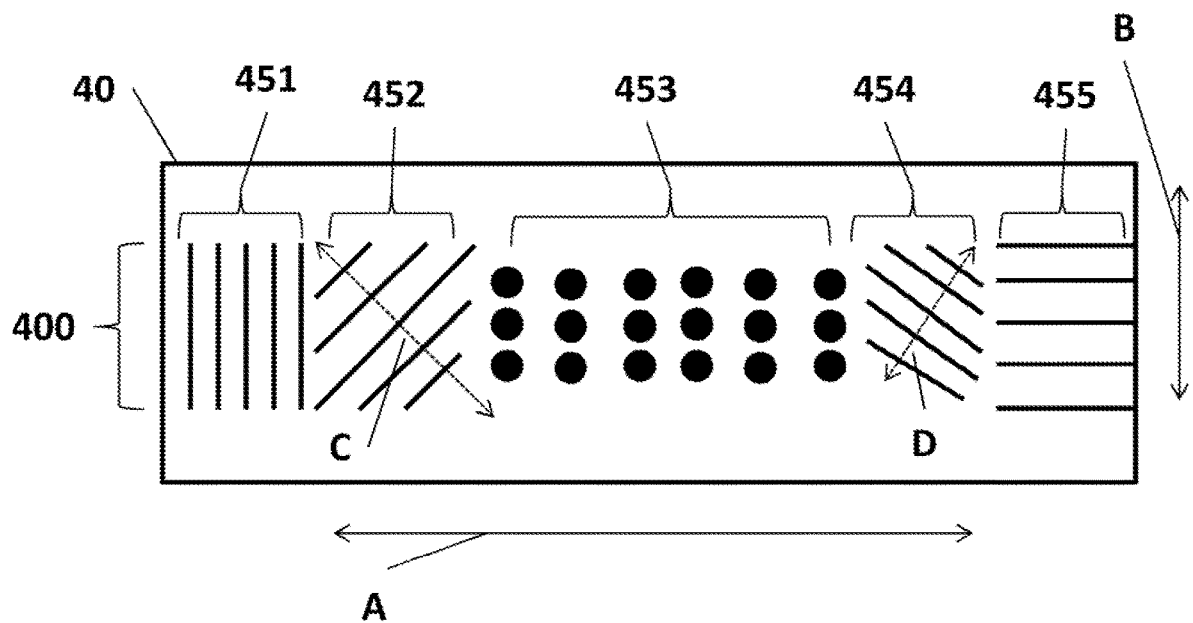
FIG. 5 illustrates various examples of adhesive patterns that can form a seam between two pieces of fabric.

FIG. 5 shows various examples of glue patterns. As illustrated in FIG. 5, the fabric 40 has a first glue pattern 451, a second glue pattern 452, a third glue pattern 453, a fourth glue pattern 454, and a fifth glue pattern 455 upon which a seam 400 can be formed.

With respect to FIG. 5, the first glue pattern 451 is a series of lines having a direction parallel to double-ended arrow B. In this example, the portion of the seam 400 associated with the first glue pattern 451 has more stretch in the direction parallel to double-ended arrow A, and less stretch in the direction parallel to double-ended arrow B. In other words, the portion of the seam 400 associated with the first glue pattern 451 has more stretch in a direction perpendicular to a direction of the glue pattern lines.

With respect to the third glue pattern 453, the third glue pattern 453 is a uniform pattern of dots of glue. In this example, the portion of the seam 400 associated with the third glue pattern 453 has equal stretch in both the direction parallel to double-ended arrow B and the direction parallel to double-ended arrow A. In other words, the seam 400 associated with the third glue pattern 453 has equal directional stretch.

With respect to the fifth glue pattern 455, the fifth glue pattern 455 is a series of lines having a direction perpendicular to double-ended arrow B. In this example, the portion of the seam 400 associated with the fifth glue pattern 455 has more stretch in the direction parallel to double-ended arrow B, and less stretch in the direction parallel to double-ended arrow A. In other words, the portion of the seam 400 associated with the fifth glue pattern 455 has more stretch in a direction perpendicular to a direction of the glue pattern lines.

With respect to the second glue pattern 452, the second glue pattern 452 is a series of lines having a direction perpendicular to double-ended arrow C. In this example, the portion of the seam 400 associated with the second glue pattern 452 has more stretch in the direction parallel to double-ended arrow C, and less stretch in the direction perpendicular to double-ended arrow C. In other words, the portion of the seam 400 associated with the second glue pattern 452 has more stretch in a direction perpendicular to a direction of the glue pattern lines.

With respect to the fourth glue pattern 454, the fourth glue pattern 454 is a series of lines having a direction perpendicular to double-ended arrow D. In this example, the portion of the seam 400 associated with the fourth glue pattern 454 has more stretch in the direction parallel to double-ended arrow D, and less stretch in the direction perpendicular to double-ended arrow D. In other words, the portion of the seam 400 associated with the fourth glue pattern 454 has more stretch in a direction perpendicular to a direction of the glue pattern lines.

It is noted additional glue patterns are possible, such as, zig-zag glue patterns, curvilinear glue patterns, fractal glue patterns, and many other glue patterns can be used to provide directionally appropriate rigidity and stretch characteristics.

Figure 6:
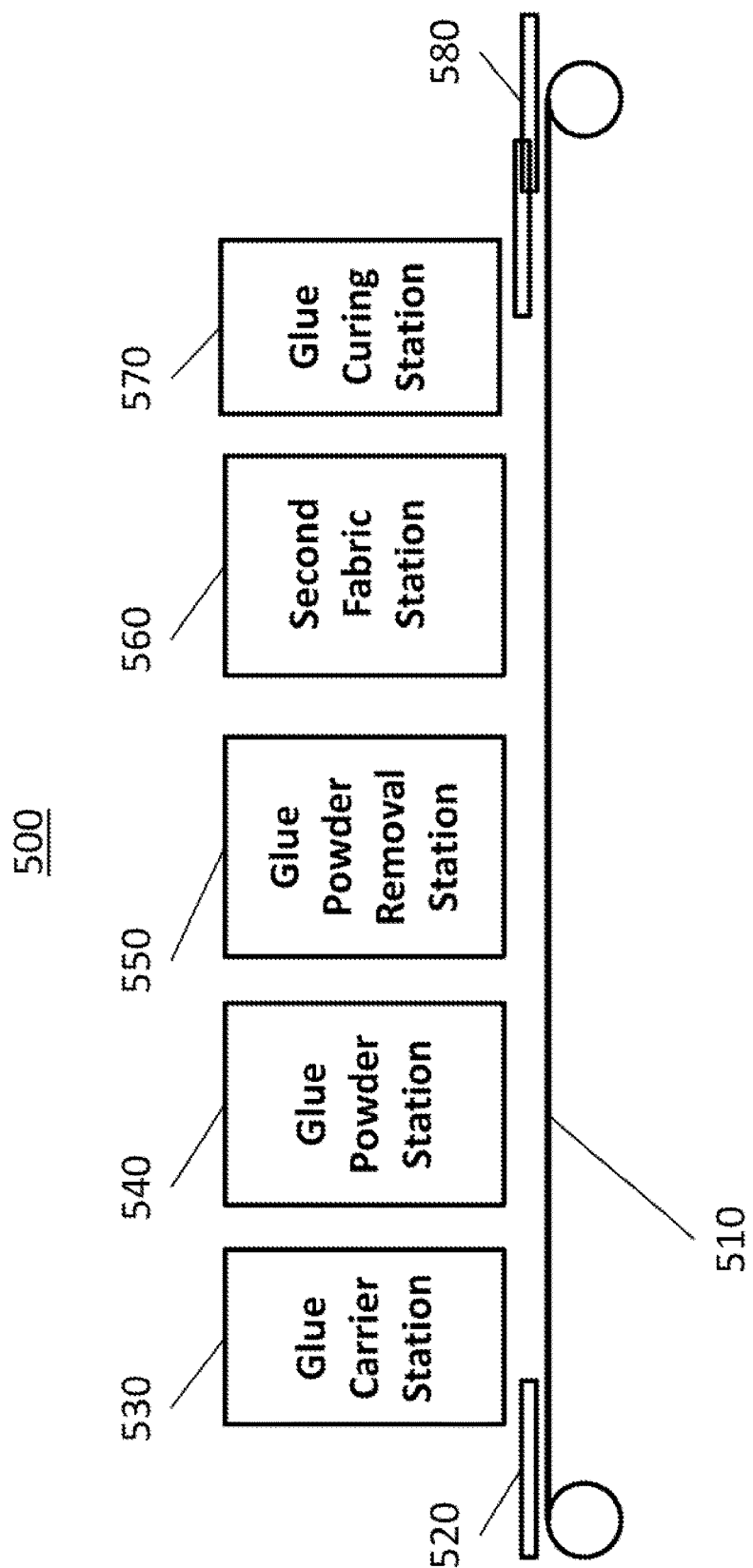
FIG. 6 illustrates a system for applying an adhesive to assemble two pieces of fabric.

FIG. 6 illustrates a system 500 for applying an adhesive to assemble two pieces of fabric. As illustrated in FIG. 6, a piece of fabric 520 is positioned on a transport system 510. The transport system 510 may be a conveyor belt, a web, or other system that is capable of moving the piece of fabric 520 from station to station.

It is noted that although FIG. 6 illustrates a system wherein the piece of fabric 520 is moved from station to station, the system can be realized with the piece of fabric 520 being stationary and the stations are moved into position.

As illustrated in FIG. 6, the piece of fabric 520 is moved to the glue carrier station 530.

The glue carrier station 530 applies a carrier liquid (not shown) to a predetermined area of the fabric 520 and in a pre-determined pattern. The carrier liquid is a liquid having characteristics or properties that enable particles of a powdered elastomer (glue), applied by glue powder station 540, to adhere thereto. In other words, the carrier liquid, applied by the glue carrier station 530, is a carrier or container for a powdered elastomer, applied by glue powder station 540, so that the applied powdered elastomer is kept within the predetermined area of the fabric 520 and in the pre-determined pattern.

The patterned image of the carrier liquid, created by the glue carrier station 530, can be realized by spraying the fluid over a stencil or mask, by screen printing, by needle array, by scanning air or pneumatically controlled orifices, by air or pneumatic orifice arrays, jetting of the carrier liquid, or other such methods or devices.

After the carrier liquid is applied to the fabric 520, the piece of fabric 520 is moved to the glue powder station 540.

As noted above, the glue powder station 540 applies particles of a powdered elastomer (not shown) uniformly to the fabric 520. The particles of a powdered elastomer will adhere to the fabric where the carrier liquid is applied and not to the fabric 520 lacking the applied carrier liquid.

After the particles of a powdered elastomer are applied to the fabric 520, the piece of fabric 520 is moved to the glue powder removal station 550.

At the glue powder removal station 550, excess particles of the powdered elastomer are removed from the fabric 520. The glue powder removal station 550 may use a vacuum to remove the excess particles of the powdered elastomer. Additionally, the glue powder removal station 550 may use an air knife or a combination of a vacuum and air knife to remove the excess particles of the powdered elastomer. It is noted that the removed excess particles of the powdered elastomer can be reused.

After the excess particles of the powdered elastomer are removed from the fabric 520, the piece of fabric 520 is moved to the second fabric station 560.

At the second fabric station 560, a second piece of fabric (not shown) is applied over the first fabric 520.

After the second piece of fabric is applied over the first fabric 520, the two pieces of fabric are moved to the glue curing station 570.

At the glue curing station 570, the particles of the powdered elastomer are activated (glue cured). The particles of the powdered elastomer can be activated by heat, pressure, a solvent, light, etc., or any combination thereof.

After the particles of the powdered elastomer are activated (glue cured), the system 500 outputs two pieces of seamed fabric 580.

It is noted that the fabric 520 can be precut, in a roll, or other such format that is convenient.

It is noted that the removal of the excess powder can be realized by vacuuming; by turning the fabric over and having gravity pull the loose powder off, by blowing the loose powder off, by adhesive roller application, or by other such method.

In some cases, it may be helpful to partially melt or attach the glue to the first fabric before the second fabric is joined in a seam. This can be done by allowing the carrier liquid to activate the adhesive powder, rendering the adhesive powder tacky, partially melting the adhesive, or partially curing the adhesive either before or after the removal of the powder.

The fabric to be joined to the seam may be placed on the original fabric, and by applying heat and pressure, the glue is activated and the fabrics joined. Other adhesives may require light or other chemicals to activate the adhesive.

It is noted that additional layers can be stacked to make multilayer seams

The system of FIG. 6 allows the patterning of the glue to control the way the seam stretches. In general, a solid line of glue will stretch less than a dotted line of glue. The ability to control the pattern allows the user to design a glue pattern for stretch, which is parallel or perpendicular to the seam or any angle in between. Additionally, patterns can be formed to allow for stretch in all directions.

As discussed above, the system of FIG. 6 allows patterning of the glue to control the way the seam stretches. In general, a solid line of glue will stretch less than a dotted or broken line of glue.

The system of FIG. 6 allows a user to design a glue pattern for a particular stretch characteristic, such as parallel or perpendicular to the seam or any angle in between. Additionally, as noted above, glue patterns can allow for stretch in all directions.

Moreover, the system of FIG. 6 allows seams to be printed on curves with the glue pattern shifting to maintain desired stretch characteristics.

The glue pattern can also be modified as necessary to improve the adhesion between the materials being joined. For example, some seams may require bigger spots, some smaller. The glue itself can be changed to fit the materials being joined. Since the glue is applied as a powder, the process enables a wide range of types of glues and adhesives to be used.

Although the above-described process has been described in connection with fabric and garment applications, it is noted that the above-described process may also be applicable in many manufacturing fields.

For example, the joining of non-porous substrates (metal to metal, metal to plastic, metal to ceramic, ceramic to ceramic, . . . ) to porous substrates (nonwoven or woven fabrics to metals or ceramics, . . . ) all can be simplified using the above-described process.

Additionally, the above-described process can be applied to three dimensional formed objects. In processing three dimensional formed objects, the fluid jetted to define the ink (liquid) image can be a gel ink (liquid) or an ink (liquid) with other rheology appropriate to allow the ink (liquid) to retain its pattern even when applied to a vertical surface.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A method of applying glue to a fabric, comprising:
   (a) applying a carrier liquid to a predetermined area of a first piece of fabric and in a pre-determined pattern;
   (b) applying uniformly, to the first piece of fabric, particles of a powdered elastomer such that the particles of the powdered elastomer adhere to the applied carrier liquid;
   (c) removing excess particles of the powdered elastomer, the excess particles of the powdered elastomer being particles of the powdered elastomer not adhering to the applied carrier liquid;
   (d) applying a second piece of fabric to the predetermined area of the first piece of fabric; and
   (e) curing the particles of the powdered elastomer to create a bonded seam between the first piece of fabric and the second piece of fabric.

2. The method as claimed in claim 1, wherein the excess particles of the powdered elastomer are removed using a vacuum.

3. The method as claimed in claim 1, wherein the excess particles of the powdered elastomer are removed using an air knife.

4. The method as claimed in claim 1, wherein the particles of the powdered elastomer are cured using heat.

5. The method as claimed in claim 1, wherein the particles of the powdered elastomer are cured using pressure.

6. The method as claimed in claim 1, wherein the particles of the powdered elastomer are cured using a solvent.

7. The method as claimed in claim 1, wherein the particles of the powdered elastomer are cured using light.

8. The method as claimed in claim 1, wherein the predetermined pattern enables stretch in a direction parallel to the bonded seam between the first piece of fabric and the second piece of fabric.

9. The method as claimed in claim 1, wherein the predetermined pattern enables stretch in a direction perpendicular to the bonded seam between the first piece of fabric and the second piece of fabric.

10. The method as claimed in claim 1, wherein the pre-determined pattern enables stretch in a direction non-perpendicular and non-parallel to the bonded seam between the first piece of fabric and the second piece of fabric.

* * * * *